358-74.                SR 8-5-75      XR      3,898,381

United States Patent [19]

Amsen et al.

[11] 3,898,381

[45] Aug. 5, 1975

[54] TELEVISION DISPLAY APPARATUS INCLUDING A BEAM CURRENT CLAMPING CONTROL CIRCUIT

[75] Inventors: Willem Hendrik Amsen; Paulus Joseph Maria Hovens, both of Emmasingel, Eindhoven, Netherlands

[73] Assignee: U.S. Philips Corporation, New York, N.Y.

[22] Filed: Jan. 10, 1974

[21] Appl. No.: 432,325

[52] U.S. Cl. .......... 178/7.5 R; 358/74

[51] Int. Cl. .......... H04n 3/16

[58] Field of Search .... 178/7.5 R, 7.5 DC, DIG. 29; 358/34, 74

[56] References Cited

UNITED STATES PATENTS

| | | | |
|---|---|---|---|
| 3,558,817 | 1/1971 | Avoort et al. | 178/7.5 R |
| 3,602,642 | 8/1971 | Avoort et al. | 178/7.5 R |

*Primary Examiner*—Richard Murray
*Assistant Examiner*—Aristotelis M. Psitos
*Attorney, Agent, or Firm*—Frank R. Trifari; Henry I. Steckler

[57] ABSTRACT

A beam current clamping control circuit in which in case of a too large deviation of the desired value of the field frequency measured beam current an accelerated correction of this deviation is effected.

5 Claims, 5 Drawing Figures

TELEVISION DISPLAY APPARATUS INCLUDING A BEAM CURRENT CLAMPING CONTROL CIRCUIT

Figure 1:
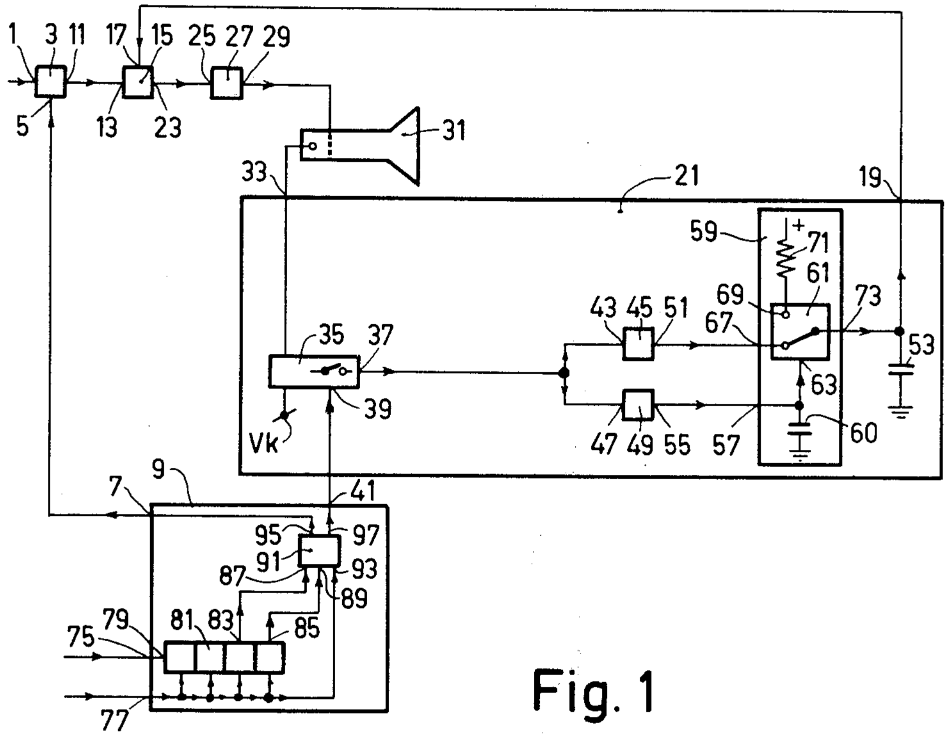

The invention relates to television display apparatus including a beam current clamping control circuit comprising a beam current measuring circuit coupled to a television display tube and operable by a pulse generator for measuring during at least part of a line scan time of a field blanking period a beam current reference level to be corrected, a level insertion circuit for inserting during the measuring time the reference level into a video signal to be applied to the television display tube, and a level correction circuit coupled to an output of the measuring circuit and to a control electrode of the television display tube, the measuring circuit including a threshold circuit and a storage circuit.

Television display apparatus of this type is known from U.S. Patent No. 3,562,409 in which the threshold circuit ensures that in case of a too large deviation of the beam current relative to the desired value the drive of the storage circuit is limited.

It is an object of the invention to provide improved television display apparatus of the kind described in the preamble which is characterized in that the threshold circuit is a circuit which in case of occurrence of a too large beam current applies a signal to an output thereof which output is coupled to an operation signal input of a circuit extending the charge corrections time of the storage circuit per field period.

Due to the limiting circuit in the circuit arrangement described in the abovementioned U.S. Patent Specification, in combination with the short measuring time available it could occur in the known circuit arrangement that, for example, after switching on the apparatus a very brightly lit picture occurred for several seconds. The storage circuit must include a capacitor having a fairly large capacitance the charge of which must be corrected in the known circuit with a current limited by the threshold circuit during the measuring time.

As a result of the step according to the invention the threshold circuit does not serve to limit the current intensity during the correction of the charge but to activate a circuit in case of a too large deviation of the nominal beam current, which circuit accelerates a feedback of the beam current to the nominal value by realising an extended charge correction time for the storage circuit. Consequently a feedback of the beam current to a level which is not troublesome can be obtained in a very quick manner without the current intensity in circuit elements correcting the charge of the storage circuit becoming too large.

The extended charge correction time of the storage circuit can be obtained by applying a correction charge from a current source which is independent of the measuring value under the influence of the threshold circuit during a time which is considerably longer than the measuring time, or by increasing the measuring frequency so that a current source which is dependent on the measuring value can recharge the storage circuit more frequently per unit of time.

The invention will now be described with reference to the drawing and some embodiments.

In the drawing:

FIG. 1 illustrates by way of a block-schematic diagram a television display apparatus according to the invention.

Figure 2:
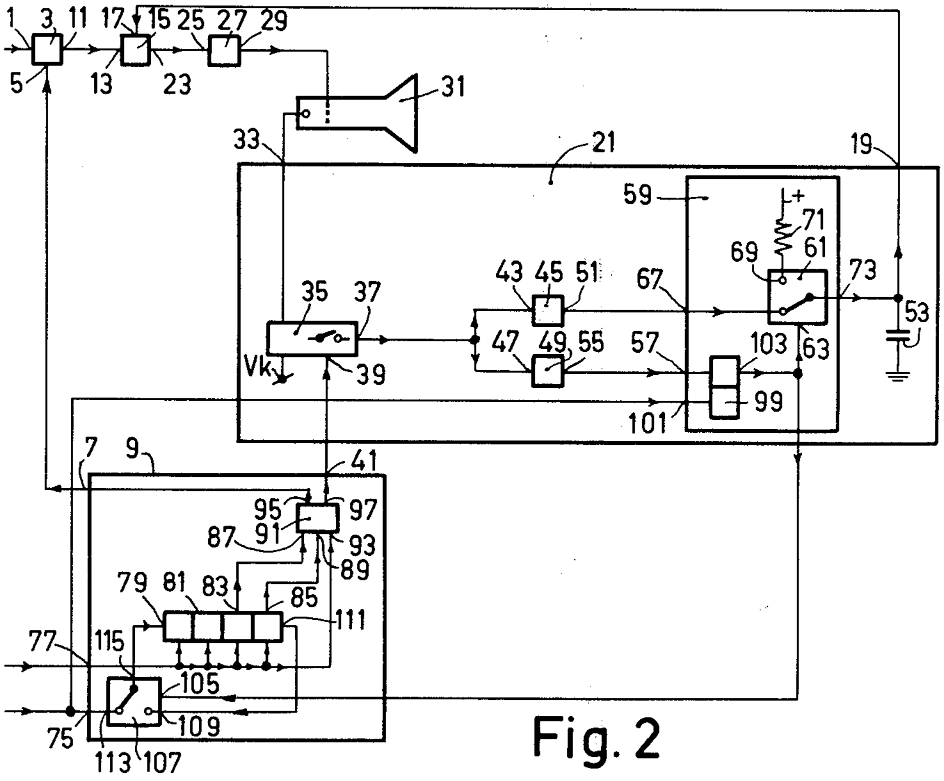
Figure 3:
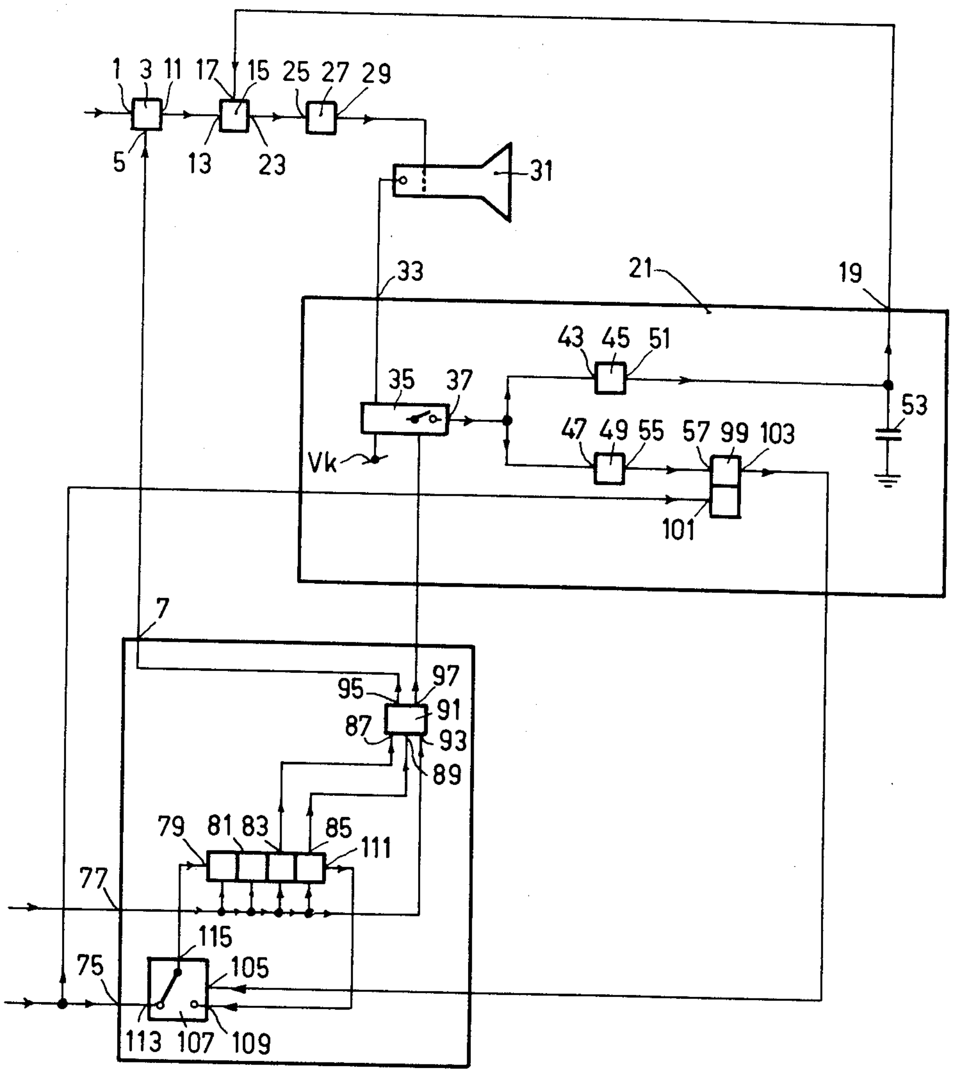
Figure 4:
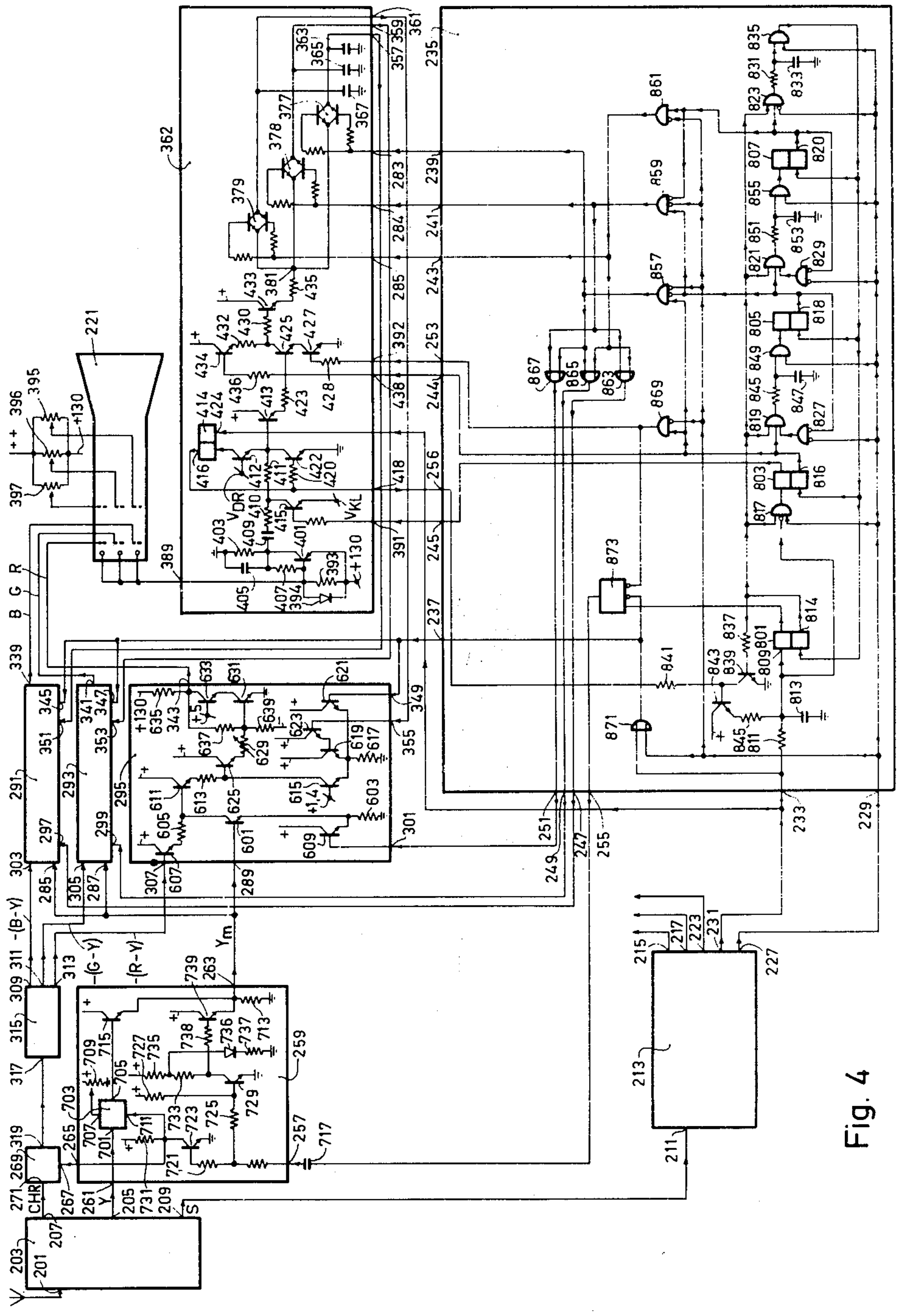
Figure 5:
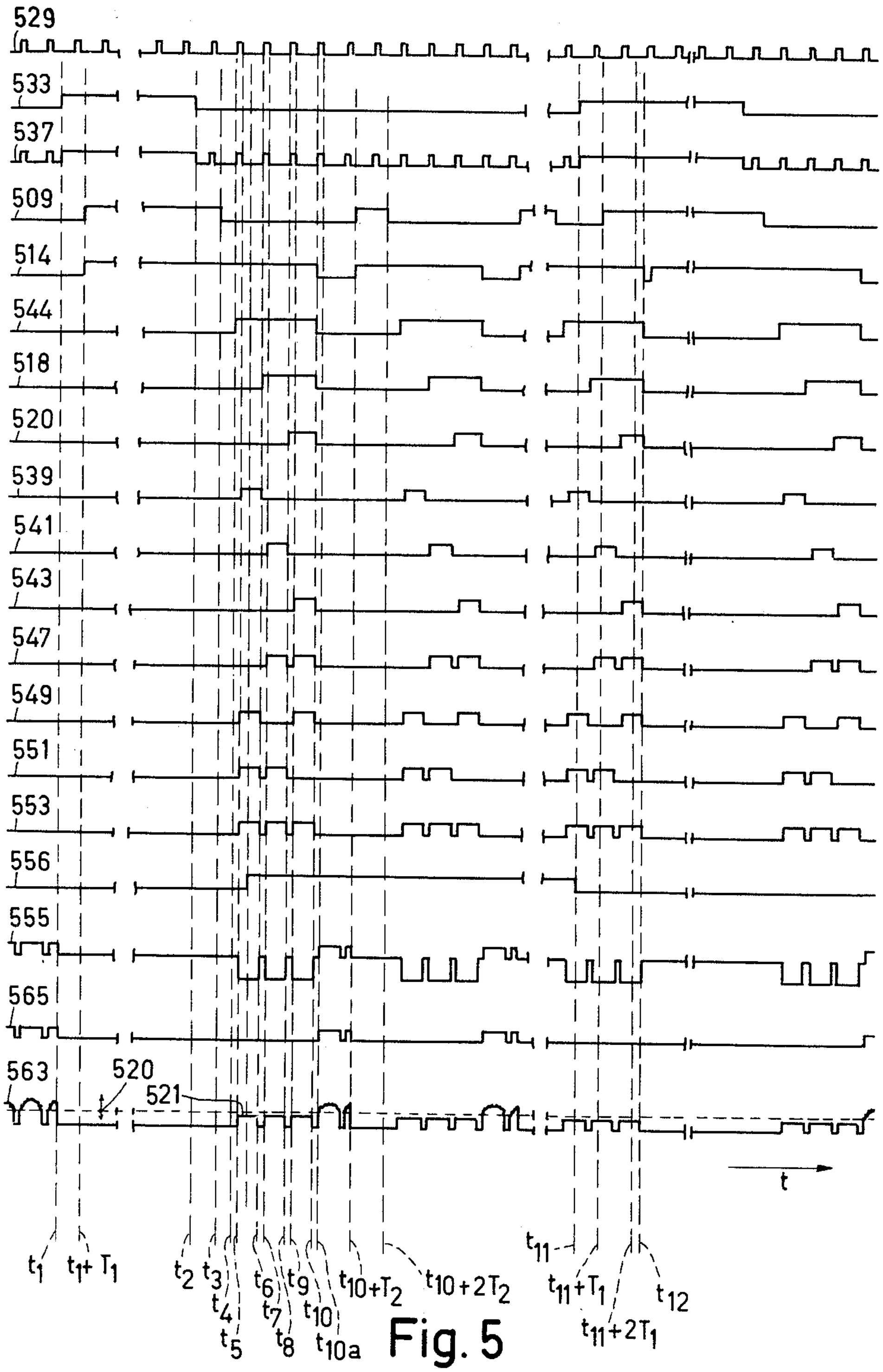

FIG. 2 illustrates by way of a block-schematic diagram a further elaboration of a television display apparatus according to the invention, FIG. 3 likewise illustrates by way of a block-schematic diagram a further embodiment of a television display apparatus according to the invention, FIG. 4 illustrates partly by way of a block-schematic diagram and partly by way of a principle circuit diagram a colour television display apparatus according to the invention including a sequential measuring circuit and FIG. 5 shows a number of wave forms as may occur in the circuit of FIG. 4.

In FIG. 1 a video signal is applied to an input 1 of a level insertion circuit 3 which signal is provided with a reference level every time during some line times of a field some time after a field flyback with the aid of a signal obtained from an output 7 of a pulse generator 9 and applied to a further input 5. The video signal with the reference level is passed from an output 11 of the level insertion circuit 3 to an input 13 of a beam current level correction circuit 15. A level correction quantity obtained from an output 19 of a measuring circuit 21 is applied to a further input 17 of the beam current level correction circuit 15. A video signal having a reference level and an added level correction quantity is obtained from an output 23 and is applied to an input 25 of an amplifier 27 an output 29 of which is connected to the wehnelt electrode of a television display tube 31. A cathode of the television display tube 31 is connected to an input 33 of the measuring circuit 21.

The measuring circuit 21 includes a gating circuit 35 connected to the input 33 which applies a quantity dependent on the beam current to an output 37 during the occurrence of the reference level. The gating circuit 35 is arranged with the aid of a gating signal applied to a gating signal input 39 and originating from an output 41 of the pulse generator 9.

The quantity dependent on the beam current produced during the occurrence of the reference level is applied from the output 37 of the gating circuit 35 to an input 43 of a detection circuit 45 and to an input 47 of a threshold circuit 49.

An output 51 of the detection circuit 45 is connected in the normal operating condition to a storage capacitor 53 which constitutes a storage circuit with the circuit arrangement connected thereto and which has a time constant which is long relative to the field period. The beam current level correction quantity occurring at the output 19 of the measuring circuit 21 is then obtained from the storage capacitor 53 which quantity readjusts the beam current to a constant value.

The threshold circuit 49 has an output 55 which is connected to an operation signal input 57 of a circuit 59 extending the charge correction time of the storage circuit. The circuit 59 extending the charge correction time includes a second storage capacitor 60 which can retain a voltage optionally provided by the threshold circuit for some time and a changeover switch 61 an operation signal input 63 of which is connected to the operation signal input 57 of the circuit 59 extending the recharge time. The changeover switch 61 has an input 67 which is connected to the output 51 of the detection circuit 45 and an input 69 which is connected through a resistor 71 to a positive supply voltage. An output 73 of the change-over switch is connected to the storage capacitor 53 and the output 19 of the measuring circuit 21.

In the normal operating condition the change-over switch 61 occupies the position shown and the above-described beam current control occurs.

When the beam current is very large during the measuring time, which means that the voltage at the storage capacitor 53 is very low, threshold circuit 49 applies a voltage to its output 55 which sets the change-over switch 61 to the position not shown and, dependent on the discharge time of the second storage capacitor 60, retains it in that position for some time, for example, several hundred line times. The resistor 71 then constitutes a current source independent of the measuring value which increases the voltage across the storage capacitor 53. During the next measurement the threshold circuit 49 determines whether this increase has been sufficient or not so that the change-over switch 61 can remain in the position shown or must be reset once more for some time.

The pulse generator 9 has an input 75 to which field frequency pulses derived from field synchronising or field flyback pulses are applied and an input 77 to which pulses derived from line synchronizing or line flyback pulses are applied. The input 75 is connected to an input 79 of a shift register 81 which in this case has four sections but of which the number of sections can of course be chosen arbitrarily. A line frequency pulse originating from the input 77 serves as a clock pulse for the shift register 81 into which, for example, at the end of the field flyback time a one is shifted which is shifted one section further at every subsequently occurring clock pulse. The last two sections of the shift register have outputs 83 and 85 which are connected to inputs 87 and 89, respectively, of a gating circuit 91 which has a further input 93 connected to the input 77. The gating circuit 91 supplies signals to two outputs 95 and 97 which signals are applied to the outputs 7 and 41 of the pulse generator 9 and which have the functions described hereinbefore.

In FIG. 2 corresponding components have the same reference numerals as those in FIG. 1. For the description of this Figure reference is made to FIG. 1.

The circuit arrangement of FIG. 2 differs from that of FIG. 1 in that the second storage capacitor 60 of the circuit 59 extending the recharge time of the first storage capacitor 53 is replaced by a trigger circuit 99 a set input of which is the input 57 which is connected to the output 55 of the threshold circuit and a reset input 101 of which is connected to the input 75 of the pulse generator 9 to which the field frequency pulses are applied. An output 103 of the trigger circuit is connected to the input 63 of the change-over switch 61 and to an operation signal input 105 of a second change-over switch 107 in the pulse generator 9. An input 109 of the second change-over switch 107 is connected to an output 111 of the shift register 81 and an input 113 is connected to the input 75 for field frequency pulses from the pulse generator 9. An output 115 of the change-over switch 107 is connected to the input 79 of the shift register 81.

In the position shown of the change-over switches 61, 107 the operation of the circuit arrangement is the same as in the case of FIG. 1. When a too high beam current is detected by the threshold circuit 49, the trigger circuit 99 will be set and the change-over switches 61 and 107 will be brought to the position not shown. The storage capacitor 53 will then be charged through the resistor 71 likewise as in the case of FIG. 1. The change-over switch 107 connects the output 111 of the shift register 81 to its input 79 so that always a one circulates in the shift register 81 and a continuous measurement of the beam current is effected until the threshold circuit 49 no longer detects a too high beam current and due to the output voltage dropping out or due to the next field frequency pulse at the reset input 101 the trigger circuit 99 is reset and the normal state is restored.

In FIG. 3 corresponding components have the same reference numerals as those in FIGS. 1 and 2 and reference is made to the description associated with the relevent Figures.

The circuit arrangement differs from that of FIG. 2 by the absence of the first change-over switch 61. Consequently, when a too high beam current occurs the normal control loop is maintained and only due to the second change-over switch 107 the shift register 81 is enabled so that a strongly increased measuring frequency and an accelerated feedback occurs through the normal control loop to the normal state. The recharge time of the storage capacitor 53 is in this case extended because per field period a larger number of measurements and associated recharges of this capacitor is effected.

FIG. 4 shows a colour television receiver including a circuit arrangement according to the invention in which the principle as described with reference to FIG. 2 is used. The circuit arrangement has a colour television display apparatus having a sequential beam current measuring circuit whose principle is described in prior application Ser. No. 402,159, filed Oct. 1, 1973, now abandoned.

When a colour television signal is applied to an input 201 of a high frequency-intermediate frequency and detection section 203, a luminance signal Y is produced at an output 205, a chrominance signal Chr is produced at an output 207 and a synchronizing signal S is produced at an output 209.

The synchronizing signal S is applied to an input 211 of a time base generator 213 connected to the output 209. Deflection currents for a television display tube 221 are obtained at two outputs 215 and 217 and an EHT for the supply of the display tube 221 is obtained at an output 223.

An output 227 of the time base generator 213 applies line flyback pulses to an input 229 and an output 231 applies field flyback pulses to an input 233 of a pulse generator 235. These pulses are shown in FIG. 5 by the waveforms 529 and 533, respectively.

Furthermore FIG. 5 shows a number of waveforms 537, 509, 514, 544, 548, 520, 539, 541, 543, 547, 549, 551, 553, 656, 555, 565 and 563 and a number of instants $t_1$, $t_1$+$T_1$, $t_3$ to $t_{10}$, $t_{10a}$, and $t_{10} + T_2$, $t_{10} + 2T_2$, $T_{11}$, $t_{11} + T_1$, $t_{11} + 2\ T_1$, and $t_{12}$ which are important for explaining the operation of the circuit arrangement. The waveforms are not shown to scale.

The pulse generator 235 has a number of outputs 237, 239, 241, 243, 244, 245, 247, 249, 251, 253, 255 and an input 256 at which the waveforms 537, 539, 541, 543, 545, 547, 549, 551, 553, 555 and 556, respectively, are present.

The output 255 of the pulse generator 235 is connected to an input 257 of a level insertion circuit 259 an input 261 of which is connected to the output 205 of the section 201 and receives the luminance signal Y therefrom. The level insertion circuit 259 has an output 263 at which the modified luminance signal denoted by the waveform 563 of FIG. 5 is produced which includes a reference level 521 during three line times $t_5$–$t_6$, $t_7$–$t_8$, $t_9$–$t_{10}$ at the commencement of the field, which level is inserted with the aid of the wave-form 555 applied to the input 257.

The waveform 565 is then produced at a further output 265 of the level insertion circuit 259, which waveform is applied to an input 267 of a chrominance signal amplifier 269 for suppressing the chrominance signal applied to an input 271 connected to the output 207 of the section 201.

The output 263 of the level insertion circuit 259 is connected to inputs 285, 287 and 289 of suppression and level correction circuits 291, 293 and 295, respectively, inputs 297, 299 and 301 of which are connected to outputs 247, 249 and 251 of the pulse generator 235 and inputs 303, 305 and 307 of which are connected to outputs 309, 311 and 313, respectively, of a demodulator and matrix circuit 315 to whose input 317 a chrominance signal originating from an output 319 of the chrominance signal amplifier 219 is applied.

The demodulator and matrix circuit applies a (B−Y), (G−Y) and (R−Y) colour difference signal to its outputs 309, 311 and 313, respectively. These colour difference signals are combined in the suppression and level correction circuits 291, 293 and 295 with the modified luminance signal applied to the inputs 285, 287 and 289 to form colour signals R, G and B, while as a result of the signals with the waveforms 547, 549, 551 at the inputs 297, 299 and 301 the reference level 521 originating from the luminance signal is suppressed in a special sequence. In this example a sequence is maintained in which only a reference level is left in the R-signal from $t_5$ to $t_6$, in the G signal from $t_7$ to $t_8$ and in the B signal from $t_9$ to $t_{10}$.

The suppression and level correction circuits 291, 293 and 295 furthermore have outputs 339, 341, 343 connected to the wehnelt electrode of the red, blue and green guns of the display tube 221 and inputs 345, 347 and 349 connected to the output 237 of the pulse generator 235 for receiving a suppression signal of the waveform 537 which prevent a signal supply to the display tube 221 during the time base flyback times. Inputs 351, 353 and 355 are furthermore connected to outputs 357, 359 and 361, respectively, of a measuring circuit 362 which outputs are connected to storage capacitors 363, 365 and 367, respectively, whose other ends are connected to earth. The storage capacitors 363, 365 and 367 are connected to switches 377, 378 and 379 respectively, operation signal inputs 383, 384 and 385 of which are connected to outputs 239, 241 and 243, respectively, of the pulse generator 235.

The switch 377 conducts from $t_5$ to $t_6$, the switch 378 conducts from $t_7$ to $t_8$ and the switch 379 conducts from $t_9$ to $t_{10}$. Each of these switches introduces a level applied to an input 381 thereof into the relevant storage capacitors 363, 365, 367.

The cathodes of the television display tube 221 are interconnected and are connected to an input 389 of the measuring circuit 362. Sequentially by each cathode voltages is generated across a resistor 393 connected to the input 389 which resistor is shunted by a diode 394 and is connected at its other end to a voltage of + 130 Volt during the said periods. This generated voltage produces a corresponding voltage across the storage capacitors 363, 365 and 367 which is retained during the next field flyback time and is passed on for beam current control to the inputs 351, 353 and 355 of the suppression and level correction circuits 291, 293 and 295. The two cathodes which are not measured then do not convey any beam current.

An input 391 of the measuring circuit is connected to the output 245 and an input 392 is connected to the output 253 of the pulse generator 235.

The screen grids of the guns of the television display tube 221 are each connected to an adjusting point of potentiometers 395, 396 and 397 between + 130 Volt and a higher voltage ++.

A signal occurring at the cathodes of the television display tube 221 produces a voltage across the resistor 393 which voltage is limited by the diode 394 blocked during the measuring periods. This voltage is applied to the base of a pnp transistor 401 whose emitter is connected to the other end of the resistor 393. The collector of the transistor 401 is connected to earth through a resistor 403, connected to earth through a capacitor 405 for high frequencies and has a negative feedback to the base through a resistor 407.

A signal amplified by the transistor 401 is applied through a series arrangement of a capacitor 409, a resistor 410 and a resistor 411 to the base of an npn transistor 413. The collector of an npn transistor 415 serving as a clamping switch is connected between the resistors 410 and 411. The emitter is connected to a clamping voltage $V_{kl}$ and the base is connected to the input 391 of the measuring circuit 362.

As a result of the waveform applied to the input 391, which waveform is the inverse form of waveform 544, the transistor 415 is cut off during the occurrence of the signal produced by the reference level 521. During the preceding line periods the capacitor 511 has reached a constant charge condition (clamped) through the then conducting transistor 415 because both the luminance signal and the chrominance signal are suppressed and the cathodes of the display tube 221 do not convey any current.

During the period $t_4$–$t_{10}$ signals caused by the reference level 521 occur successively during the periods $t_5$ −$t_6$, $t_7$ − $t_8$ and $t_9$ − $t_{10}$ at the successive cathodes of the display tube 221 which signals are applied in an amplified manner to the base of the transistor 413 and which furthermore appear at the emitter of an npn transistor 412 connected to the base of the transistor 413.

When the signals have an amplitude which is not too large they are passed on by the transmitter 413 through its emitter and a resistor 423 to the base of an npn transistor 425.

When the signals at the base of the transistor 413 have a too large amplitude the emitter of the transistor 412 will become more negative than its base connected to a threshold voltage $V_{dr}$ and this transistor 412 will start conducting and hence operate a set input of a trigger circuit 414 connected to its collector which then provides a positive voltage for its output 416. This positive voltage (waveform 556) is applied to an output 418 which is connected to the input 256 of the pulse generator 235 and which causes a variation to a free-running state which will be described hereinafter, while this voltage also controls the base of an npn transistor 422 through a resistor 420 and the emitter of this transistor is connected to earth while the collector is connected to the base of the transistor 413. The base of this transistor 413 then is no longer controlled because the transistor 422 acts as a short circuit for its input signal. The trigger circuit 414 furthermore has a reset input 424 to which a field flyback pulse (waveform 533) originating from the output 231 of the time base generator 213 is applied so that the trigger circuit 414 is reset every time at the commencement of the field flyback.

In the state in which the beam current is not too large the transistors 412 and 422 do not conduct and the signal is passed on through the transistor 413 to the base of the transistor 425 whose emitter is connected to the collector of an npn transistor 427 whose emitter is connected to earth and whose base is connected through a resistor 428 to the input 392 of the measuring circuit. The collector of the transistor 425 is connected through a resistor 430 to the base of an npn transistor 433 whose emitter is connected through a resistor 435 to the input 381 of the sequence switches 377, 378 and 379.

The collector of the transistor 425 is connected through a resistor 432 to the emitter of an npn transistor 434 arranged as an emitter follower whose base is connected through a resistor 436 to an input 438 of the measuring circuit 362 which is connected to the output 244 of the pulse generator 235 at which the waveform 544 occurs. This transistor 434 conducts during the measuring period and furthermore every time during a number of line times in the field scan time when the pulse generator 235 has acquired a free-running state (waveform 544) due to a too high beam current with the aid of the trigger circuit 414.

The transistor 427 conducts due to the waveform 553 during the measuring periods so that in the periods $t_5$–$t_6$, $t_7$–$t_8$, $t_9$–$t_{10}$ the emitter of the transistor 425 is connected to earth through the transistor 427 and the transistor 425 acts as an amplifier and passes on a signal to the base of the transistor 433 and recharges through its emitter the storage capacitors 363, 365 and 367 during the corresponding periods $t_5$–$t_6$, $t_7$–$t_8$ and $t_9$–$t_{10}$, respectively.

In the state of the circuit arrangement where a too large beam current has been detected and where the trigger circuit 414 is set, the transistor 425 does not conduct due to the short circuit of the base of the transistor 413 so that then the storage capacitors 363, 365 and 367 are recharged by the emitter follower 434, 433 every time during the periods when the waveform 544 is positive. This is effected a large number of times during field scan periods following the set of the trigger circuit 414 so that the storage capacitors are charged quickly to a higher voltage to reduce the beam current through the control loops as quickly as possible again.

The operation of a control loop will now be described. This control loop not only includes the television dislay tube 221 and the measuring circuit 362 but also the suppression and level correction circuit 295.

A modified luminance signal $Y_m$ according to the waveform 563 is applied to the input 289 in which signal the reference level 521 is present during the periods $t_5$–$t_6$, $t_7$–$t_8$ and $t_9$–$t_{10}$ and which level is suppressed from $t_1$ to $t_5$. The input 289 is connected to the base of an npn transistor 601 whose emitter is connected to earth through a resistor 603 and whose collector is connected through a resistor 605 to the emitter of an npn transistor 607. The collector of the transistor 607 is connected to a positive voltage. The base is connected to the input 307 and receives a red colour difference signal –(R–Y) which is suppressed from $t_1$ to $t_{10a}$.

Furthermore the emitter of the transistor 601 is connected to the emitter of an npn transistor 609 whose collector is connected to a positive voltage and whose base is connected to the input 301.

A voltage having the waveform 547 is applied to the input 301 so that the transistor 609 conducts during the periods $t_7$–$t_8$ and $t_9$–$t_{10}$ and thus cuts off the transistor 601 so that also the transistor 607 does not convey current and the signal at the collector of the transistor 601 is suppressed.

When the transistor 609 does not conduct a signal is generated at the collector of the transistor 601 which signal is a combination of the –(R–Y) signal supplied through the emitter follower 607 and the $-Y_m$ signal amplified through the transistor 601. This combination is a –R signal in which a level corresponding to the level 521 is present during the period $t_5$–$t_6$ and which is suppressed in the line periods $t_1$–$t_5$ and $t_6$–$t_{10a}$. This signal is applied to the base of an npn transistor 611 whose collector is connected to a positive voltage and whose emitter is connected through a resistor 613 to the collector of an npn transistor 615 whose emitter is connected to earth through a resistor 617 and whose base is connected to a reference voltage of 1.4 V.

The emitter of the transistor 615 is furthermore connected to the emitters of two npn transistors 619 and 621 whose collectors are connected to a positive supply voltage.

A level correction voltage originating from the capacitor 367 and applied to the input 355 is transferred to the base of the transistor 619 through an npn transistor 623 arranged as an emitter follower while a suppression signal having the waveform 537 applied to the input 349 is passed on to the base of the transistor 621. The latter signal ensures the common suppression of the beam current during the line and field flyback periods. Due to the fact that the otherwise cut-off transistor 621 is blocked during these flyback periods, the transistor 615 is cut off and no signal is passed to the collector of this transistor because then the emitter circuit of the transistor 611 is interrupted.

The level correction voltage applied to the input 355 is then applied through the emitters of the transistors 623 and 619 to the emitter of the transistor 615 and influences the direct current through the resistor 613 provided by the transistor 615 and hence of the direct current level of the –R signal passed through the emitter of the transistor 611 to the collector of the transistor 615.

The collector of the transistor 615 is connected to the base of an npn transistor 625 whose collector is connected to a positive voltage and whose emitter is connected through an adjustable resistor 629 to the base of an npn transistor 631. The emitter of the transistor 631 is connected to earth and the collector is connected to the emitter of an npn transistor 633 whose collector is connected through a resistor 635 to a positive supply voltage of +130 V and whose base is adjusted to a bias voltage of +5 V. The base of the transistor 631 receives a negative feedback voltage from the collector of the transistor 633 through a potential divider 637, 639 to a negative voltage.

A red colour signal amplified by the transistors 631 and 633 is obtained from the collector of the transistor 633 and is applied through the output 343 to the wehnelt electrode of the red gun of the display tube 221. This signal includes the correction level originating from the capacitor 363 with which the beam current in the red gun is adjusted to a desired value.

The amplification of the circuit arrangement is adjustable with the resistor 629 so as to perform for example, a white point correction. Due to the control loop such an adjustment has substantially no influence on the beam current which is produced by the reference level 521 so that the black level and hence the colour of dark picture parts does not change due to the adjustment.

The modified luminance signal $Y_m$ for the input 289 is obtained in the level insertion circuit 259.

A luminance signal is applied to the input 261 which signal is applied to an input 701 of an amplifier 703. Furthermore the amplifier 703 has an input 707 to which an adjustable direct voltage is applied with the aid of a potentiometer 709 which serves for luminance adjustment and an input 771 to which a suppression signal is applied as is shown by the waveform 555. The black level of the picture 520 in the waveform 563 is adjustable with the aid of the potentiometer 709 relative to the level occurring during the suppression periods. The waveform 563 is the luminance signal which occurs at the output 263 across an emitter resistor 713 of an npn transistor 715 arranged as an emitter follower whose base is connected to an output 705 of the amplifier 703.

A signal having the waveform 555 is applied to the input 257 of the level insertion circuit through a capacitor 717, which signal is passed at one end through a resistor 721 to the base of an npn transistor 723 and at the other end through a potential divider 725, 727 to the base of an npn transistor 729.

During the most positive parts of the waveform 555 a low voltage is produced across a collector resistor 731 of the transistor 723. The level of the signal during the periods $t_5$–$t_{10}$ lies below the cut-off point of the transistor 727 so that this is not found back in the collector signal 565 of this transistor. As a result of the potential divider 725, 727 connected to the positive voltage the transistor 729 only reacts to the most negative parts of the signal 555 and the transistor 729 is cut off during the periods $t_5$–$t_6$, $t_7$–$t_8$ and $t_9$–$t_{10}$ so that then positive going square-wave voltages occur at the collector of this transistor.

The collector of the transistor 729 is connected through a resistor 733 to a potential divider including a resistor 735 and a series arrangement of a diode 736 and a resistor 737. The voltage at the wiper of this potential divider has a constant value of + 2.2 V which also occurs at the collector of the transistor 729 during the said periods. This voltage is passed on through a resistor 738 to the base of an npn transistor 739 whose collector is connected to a positive supply voltage and whose emitter is connected to the emitter of the transistor 715. During the periods $t_5$–$t_6$, $t_7$–$t_8$ and $t_9$–$t_{10}$ the emitter of the transistor 739 is brought to a voltage of +1.5 V due to its base voltage so that the transistor 715 is cut off and the reference level 521 is produced at the output 263. The rest of the period the transistor 739 is cut off and a signal is applied to the output 263 through the transistor 715.

In the waveform 563 arrows show that the black level 520 of the signal is adjustable relative to the constant reference level 521 which as a result of the said control corresponds to a constant beam current valve in the guns of the display tube 221.

The pulses for the various parts of the circuit arrangement are supplied by the pulse generator 235.

This generator has four trigger circuits 801, 803, 805 and 807. A signal which relative to the signal 533 at the input is delayed over a time $T_1$ is applied to a set input 809 of the trigger 801 from the input 233 through a delay circuit including a resistor 811 and a capacitor 813. This signal is shown in the waveform 509. Before this pulse appears the triggers 801, 803, 805 and 807 are assumed to be in the reset condition. At the instant $t_1 + T_1$ the trigger 801 is brought to the set condition. A signal represented by the waveform 514 then appears at an output 814 thereof which signal is applied to four AND gate circuits 817, 819, 821 and 823.

Furthermore an inverted set signal from the trigger 801 is applied to the gate 817 as well as a line frequency pulse signal originating from the input 229.

In addition a signal represented by the waveform 544 originating from an output 816 of the trigger 803 and a signal originating from an AND gate 817 are applied to the gate 819.

The gate 821 furthermore receives a signal having a waveform 518 from an output 818 of the trigger 805 and a signal originating from an AND gate 829.

Furthermore the gate 823 receives a signal having a waveform 520 from an output 820 of the trigger 807 and an inverted line frequency pulse signal originating from the input 229. An output of this gate 823 is connected through a delay circuit including a resistor 831 and a capacitor 833 to an AND gate 835 which also receives a line frequency pulse signal from the input 229. The output of this gate 835 is connected to the reset inputs of all four triggers. The gates 827 and 829 receive an inverted signal from the input 229 and an output signal from the triggers 805 and 807, respectively.

Furthermore a switchable feedback is present between the output 814 of the trigger 801 and the set input thereof, which feedback is only switched on when the beam current in the display tube 221 is too high. This feedback starts from the output 814 through a resistor 837 which is connected to the base of an npn transistor 839 whose emitter is connected to earth and whose collector is connected through a resistor 841 to the input 256 and is connected to the output of the trigger circuit 414, the base of a transistor 843 connected to the collector of the transistor 839 having its collector connected to a positive supply voltage and being connected through a resistor 845 connected to the emitter of this transistor 843 to the set input 809 of the trigger 801. Together with the capacitor 813 the resistor 845 constitutes a delay circuit having a time delay $T_2$. The feedback is not present when the beam current is so low that the trigger circuit 414 is not set; the voltage at the collector of the transistor 839 is then low and the transistor 843 is cut off. This condition is assumed to be present at the commencement of the time axis in FIG. 5.

When the voltage at the input 256 becomes high due to the trigger 414 coming in the set condition the feedback will be switched on. The transistor 839 will then act as an inverter.

When at the instant $t_1 + T_1$ the trigger 801 is set, the trigger 803 is blocked at the same time by the inverted set signal from the trigger 801 applied to the gate 817.

The triggers 803, 805 and 807 then remain in the reset condition. After the end of the set pulse from the trigger 801, i.e. after the instant $t_3 = t_2 + T_1$ the gate circuit 817 becomes conducting at the instant $t_4$ due to the next line frequency pulse and brings the trigger 803 in the set condition. The gate 819 then becomes conducting after the end of the line pulse under the influence of the gate 827 and applies a pulse through a delay network 845, 847 to an input of an AND gate 849 to which also the line frequency signals of the input 229 are applied. At the next line pulse at the instant $t_6$ the trigger 805 is set so that the gate 821 provides a pulse which is delayed by a network 851, 853 and is applied to an input of an AND gate 855 to which furthermore the line frequency pulse signal from the input 229 is applied. This gate 855 becomes conducting at the next line pulse at the instant $t_8$ under the influence of the gate 829 and brings the trigger 807 to the set condition.

A pulse is obtained from the output of the gate 823 which begins after termination of the line pulse and which is applied delayed through the network 831, 833 to the gate 835 which then passes the next line pulse at the instant $t_{10}$ so that the triggers 801, 803, 805 and 807 are reset.

When meanwhile the trigger circuit 414 has not reached the set condition during the time between $t_5$ and $t_{10}$ in which the beam currents in the display tube are measured, the triggers 801, 803, 805 and 807 remain in the reset condition until the next field pulse.

When the trigger circuit 414 changes to the set condition due to a too high beam current for example between $t_5$ and $t_6$, the described feedback from the output 814 of the trigger 801 is provided at its set input 809 and a positive pulse will appear again at the instant $t_{10} + T_2$ at the input 809 which pulse will bring the trigger 809 to the set condition again so that at an instant $t_{10} + 2T_2$ the trigger 803 is set whereafter the triggers repeat the above-described conditions every time.

At the next field pulse at the instant $t_{11}$, however, the trigger 414 is reset so that the feedback in the pulse generator 235 is interrupted and a set cycle of the triggers 801, 803, 805 and 807 already started is terminated at the instant $t_{12}$ when the gate 835 applies a line pulse to the reset input of the trigger 801 so that voltage at the output 814 remains equally low and all triggers are reset. After the line pulse drops out at its reset input the trigger 801 is brought immediately to the set condition so that at the next line pulse which lies after the instant which is $T_1$ later than the trailing edge of the field pulse 533 the trigger 803 is set again and three line times later everything is reset and remains reset when the beam current has become sufficiently low due to the repeated recharge of the capacitors 363, 365, 367 in the measuring circuit 362.

A number of gate circuits supplying the output signals from the pulse generator 235 are coupled to the outputs of the trigger circuits.

The output 239 is connected to an output of an AND gate 857 which has an input connected to the output 816 of the trigger 803, an inverted input which is connected to the output 818 of the trigger 805 and an inverted input which is connected to the input 229 of the pulse generator. The output of this gate then applies the waveform 539.

The output 241 is connected to an output of an AND gate 859 and input of which is connected to the output 818 of the trigger 805, an inverted input is connected to the output 820 of the trigger 807 and an inverted input is connected to the input 229 of the pulse generator 235. The AND gate 859 provides an output signal having the waveform 541.

The output 243 is connected to an output of an AND gate 861 an input of which is connected to the output 820 of the trigger 807 and an inverted input is connected to the input 229 of the pulse generator 235. The AND gate 861 provides an output signal having the waveform 543.

The output 244 is connected to the output 816 of the trigger 803 and the output 245 is connected to an inverted output of this trigger.

The output 247 is connected to an output of an OR gate 863, the output 249 is connected to an output of an OR gate 865 and the output 251 is connected to an output of an OR gate 867. The inputs of the gate 863 are connected to the outputs of the gates 861 and 859, the inputs of the gate 865 are connected to the outputs of the gates 861 and 857 and the inputs of the gate 867 are connected to the outputs of the gates 857 and 859. The gates 863, 865 and 867 supply the signals 547, 549 and 551, respectively.

The output 253 is connected to an output of an AND gate 869 an input of which is connected to the output 816 of the trigger 803 and an inverted input is connected to the input 219 of the pulse generator 235. The waveform 553 is supplied by this gate.

The output 237 is connected to an output of an OR gate 871 whose inputs are connected to the inputs 229 and 233 of the pulse generator. The waveform 537 is provided by the gate 871.

The output 255 is connected to an output of a gate and superimposition circuit 873 an input of which is connected to an inverted output of the trigger 801, an inverted input is connected to the output of the gate 871 and an inverted input is connected to the output of the gate 869. The gate and superimposition circuit 873 provides the waveform 555.

Since the latter waveform is applied through the capacitor 717 to the input 257 of the level insertion circuit 259, an unsatisfactory amplitude selection will take place when the trigger 801, 803, 805 and 807 run free for a long period so that a charge of the capacitors 363, 365, 367 in the measuring circuit 362 is effected independently of the beam current when it has exceeded a given maximum value as described in the foregoing. The level shift due to this capacitor 717 and the results thereof are not important for the understanding of the invention and are therefore not shown in the waveforms.

Although the control voltage in the described embodiments is applied to a wehnelt electrode of the display tube it may alternatively be applied to a different control electrode.

The insertion of the reference level may of course alternatively be effected in a different manner such as, for example, by clamping the video signal on the control signal.

For switching over the described functions in case of a too large beam current value a schmitt trigger or a monostable multivibrator may be used if desired instead of a bistable trigger circuit having a set and reset, input, or an output signal from the threshold circuit may be used.

The type of measuring circuit is not important for using the step according to the invention. Instead of a sequence measuring circuit it is alternatively possible to use a simultaneous measuring circuit in which all beam currents are simultaneously measured in the case of a multigun display tube. Also the input circuit of the measuring circuit may of course be adapted as desired.

If desired other counting circuits may be used instead of a shift register.

What is claimed is:

1. Television display apparatus including a beam current clamping control circuit having a beam current measuring circuit operable by a pulse generator and coupled to a television display tube for measuring, during at least part of a line scan time of a field blanking time a beam current reference level to be corrected, a level insertion circuit for inserting the reference level during the measuring time into a video signal to be applied to the television display tube and a level correction circuit coupled to an output of the measuring circuit and to a control electrode of the television display tube, the measuring circuit including a threshold circuit and a storage circuit, characterized in that the threshold circuit is a circuit which applies a signal to an output thereof when a too large beam current occurs, said output being coupled to an operation signal input of a circuit means for extending the charge correction time of the storage circuit per field period.

2. Television display apparatus as claimed in claim 1, characterized in that the circuit extending the charge correction time is a circuit means for increasing the measuring frequency, whereby a greater number of measurements per unit time is effected.

3. Television display apparatus as claimed in claim 1, characterized in that the circuit extending the charge correction time is a change-over switch a first input of which is coupled to an input of the measuring circuit, a second input is coupled to a beam current independent charging circuit coupled to a supply source and an output is coupled to the storage circuit.

4. Television display apparatus as claimed in claim 1, characterized in that the pulse generator includes a counting circuit having a feedback which can be switched on by the threshold circuit.

5. A beam current clamping control circuit for a television display tube comprising a beam current measuring circuit means for measuring during at least part of a line scan time of a field blanking time a beam current reference level to be corrected, a pulse generator coupled to said measuring circuit, a level insertion circuit means coupled to said pulse generator for inserting the reference level during the measuring time into a video signal to be applied to the television display tube, a level correction circuit coupled to an output of the measuring circuit, the measuring circuit including a threshold circuit means for coupling to said tube for applying a signal to an output thereof when a beam current above a selected value occurs, a storage circuit, and a circuit means for extending the charge correction time of the storage circuit per field period having an input coupled to said threshold circuit output and an output coupled to said storage circuit.

* * * * *

PO-1050
(5/69)

UNITED STATES PATENT OFFICE
CERTIFICATE OF CORRECTION

Patent No. 3,898,381 Dated August 5, 1975

Inventor(s) WILLEM HENDRIK AMSEN ET AL

It is certified that error appears in the above-identified patent and that said Letters Patent are hereby corrected as shown below:

IN THE TITLE PAGE

Below "Appln. No.:432,325" insert as follows: --

Foreign Application Priority Data

February 13, 1973 Dutch......... 7301980 --;

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*